United States Patent
Ezra et al.

(10) Patent No.: US 9,216,773 B2
(45) Date of Patent: Dec. 22, 2015

(54) ACCESS PORT FOR VEHICLE

(71) Applicant: Shem, LLC, Hagerstown, IN (US)

(72) Inventors: Kyle Allen Ezra, New Castle, IN (US); Edwin Ray Drews, Anderson, IN (US)

(73) Assignee: Shem, LLC, Hagerstown, IN (US)

( * ) Notice: Subject to any disclaimer, the term of this patent is extended or adjusted under 35 U.S.C. 154(b) by 0 days.

(21) Appl. No.: 14/161,468

(22) Filed: Jan. 22, 2014

(65) Prior Publication Data
US 2015/0203161 A1 Jul. 23, 2015

(51) Int. Cl.
B62D 25/24 (2006.01)
B62D 33/06 (2006.01)
B60J 5/00 (2006.01)
B62D 25/08 (2006.01)

(52) U.S. Cl.
CPC . B62D 25/24 (2013.01); B60J 5/00 (2013.01); B62D 25/08 (2013.01); B62D 33/06 (2013.01)

(58) Field of Classification Search
CPC ......... B62D 25/24; B62D 33/06; B62D 25/20
USPC .............. 296/190.08, 190.01, 190.1, 193.07, 296/208, 204, 190.11, 24.34
See application file for complete search history.

(56) References Cited

U.S. PATENT DOCUMENTS

| | | | | |
|---|---|---|---|---|
| 2,799,528 A | * | 7/1957 | Wilfert | 294/28 |
| 3,143,373 A | * | 8/1964 | Fordyce | 296/107.01 |
| 3,151,905 A | * | 10/1964 | Reuther et al. | 49/167 |
| 4,373,153 A | * | 2/1983 | Sano et al. | 340/479 |
| 5,673,956 A | * | 10/1997 | Emery | 296/39.2 |
| 7,641,271 B1 | * | 1/2010 | Haydin et al. | 296/208 |
| 7,681,557 B2 | * | 3/2010 | Kim | 123/519 |
| 8,444,216 B2 | * | 5/2013 | Yamaguchi et al. | 296/208 |
| 8,997,908 B2 | * | 4/2015 | Kinsman et al. | 180/89.1 |
| 2003/0234557 A1 | * | 12/2003 | Bock et al. | 296/190.08 |
| 2011/0233969 A1 | * | 9/2011 | Yamaguchi et al. | 296/193.07 |
| 2014/0117722 A1 | * | 5/2014 | Lacroix | 296/208 |
| 2014/0252792 A1 | * | 9/2014 | Roggenkamp et al. | 296/70 |
| 2015/0035319 A1 | * | 2/2015 | Fabricatore et al. | 296/193.07 |

* cited by examiner

*Primary Examiner* — Gregory Blankenship
(74) *Attorney, Agent, or Firm* — Banner & Witcoff, Ltd.

(57) ABSTRACT

A vehicle has an operator cab with a wall defining an interior of the operator cab. An opening is formed through the wall of the operator cab, and a port is connected to the wall of the operator cab around the opening. The port includes a mounting structure connected to the wall and a tube member extending from the mounting structure and defining a passage therein, where the passage of the tube member is aligned with the opening. One or more conduits can then extend through the opening and the passage of the tube member. One or more additional openings may be formed through other portions of the wall of the cab, and each such opening may have a port and/or one or more conduits extending through.

22 Claims, 16 Drawing Sheets

ACCESS PORT FOR VEHICLE

TECHNICAL FIELD

The present invention generally relates to a port for providing access through panels and other structures and, in some more specific embodiments, to a reclosable access port that provides access through various vehicle panels for various conduits.

BACKGROUND

Vehicles typically include various conduits that extend between different components of the vehicle. Such conduits may include electrical conduits, e.g., wires, cables, etc., which may connect various components of the vehicle to power sources, computers such as controllers and/or data collection or monitoring modules, manual control devices, etc. Such conduits may also include conduits (e.g., pipes, tubes, etc.) for transport or containment of solid, liquid, or gaseous matter, such as HVAC conduits, hydraulic or pneumatic conduits, fuel conduits, and others. Still further types of conduits may be included in certain vehicles.

Trucks, such as refuse hauling trucks, and other vehicles often require certain conduits to pass through walls, panels, and other structural components in order to connect to the desired components. For example, many trucks have body controls and other components within the cab that need to be connected via conduits to components outside the cab. These conduits pass through the walls of the cab and/or body in connecting these components. Currently, passages for such conduits are cut by body builders when connecting body components to components within the vehicle cab. However, because these passages are formed after the equipment leaves the manufacturers, the manufacturers lack control over where such passages are formed. Thus, the manufacturers are unable to evaluate the effect of the passages on the structural integrity of the walls in which they are formed. It can be problematic for manufacturers to create such passages, however, because a single vehicle may be suitable for many different end uses, and some or all of such passages may not be used in all instances. Unused passages provide undesired environmental exposure to the inside of the cab. Additionally, the edges of these post-manufacturing passages are typically not covered by paint or other coatings, and are therefore exposed to the elements and more susceptible to corrosion. Further, even if builders cover such passages with grommets, gaskets, caulk/silicone, or other seals, the distance for environmental substances to travel through the passages is small, particularly in the case of passages through thin sheet metal walls. Thus, environmental substances can often easily migrate through the passages, despite the use of sealing structures.

Thus, while certain refuse hauling trucks and other vehicles according to existing designs provide a number of advantageous features, they nevertheless have certain limitations. The present disclosure seeks to overcome certain of these limitations and other drawbacks of the prior art, and to provide new features not heretofore available.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Some aspects of the invention relate to a vehicle that includes a chassis supporting a truck body and an operator cab and being connected to a plurality of wheels, where the operator cab has a wall defining an interior of the operator cab. An opening is formed through the wall of the operator cab, in communication with the interior and the exterior of the operator cab, and a port is connected to the wall of the operator cab around the opening. The port includes a mounting structure connected to the wall and a tube member extending from the mounting structure and defining a passage therein, where the passage of the tube member is aligned with the opening. One or more conduits can then extend through the opening and the passage of the tube member, so that the conduit(s) can be connected to one or more components on the exterior and on the interior of the operator cab. A sealant may be deposited within the passage and around the conduit(s) to further seal the passage. One or more additional openings may be formed through other portions of the wall of the cab, and each such opening may have a port and/or one or more conduits extending through, as similarly described above.

According to one aspect, the mounting structure is connected to an exterior surface of the wall and the tube member extends through the opening to the interior of the operator cab, and the length of the tube member is larger than a thickness of the wall.

According to another aspect, the mounting structure includes a flange extending outwardly around at least a portion of a periphery of the tube member and a plurality of fasteners connecting the flange to the wall.

According to a further aspect, the wall may include a floor panel supporting a seat within the operator cab, such that the opening is positioned behind the seat. Additionally, the operator cab may have a left area, a right area, and a center console separating the left and right areas, and the wall includes a console panel forming at least a portion of the center console. The console panel has a top portion configured to form at least a portion of a top surface of the center console and a pair of legs depending from the top portion to form at least portions of two sides of the center console, with the opening positioned in one of the legs. Openings may be positioned in both the floor panel and the console panel in one configuration.

Additional aspects of the invention relate to a vehicle that has a chassis supporting an operator cab and being connected to a plurality of wheels, where the operator cab has a wall separating an interior of the operator cab from an exterior of the operator cab. An opening is formed through the wall of the operator cab, in communication with the interior and the exterior of the operator cab, and a port connected to the wall of the operator cab around the opening. The port includes a mounting structure connected to an exterior surface of the wall and a tube member extending from the mounting structure through the opening to the interior of the operator cab and defining a passage therein. The mounting structure includes a flange extending outwardly around at least a portion of a periphery of the tube member and a plurality of fasteners connecting the flange to the exterior surface of the wall. A cover is removably connected to the port and obstructs the passage, where the cover is removable from the port to open the passage. The cab may include one or more additional openings and/or ports, as similarly described above.

According to one aspect, the cover is connected to an end of the tube member. In one configuration, the cover includes a flat base that obstructs the passage and a depending member depending from a periphery of the base and extending along an outer surface of the tube member, where the depending member is removably connected to the tube member. The depending member of the cover and the second end of the tube member may have corresponding apertures, and a plurality of fasteners extending through the corresponding apertures may be used to removably connect the cover to the depending member.

According to another aspect, the tube member has an oval shape (e.g., elliptical, obround, etc.), and the cover has an oval shape that is complementary with the oval shape of the tube member.

According to a further aspect, the opening(s) and port(s) may be provided in a floor panel behind the seat and/or in a side of a console panel of the center console, as described above.

Further aspects of the invention relate to a port configured for connection to a wall. The port includes a mounting structure configured to be connected to a surface of the wall around an opening in the wall and a tube member extending from the mounting structure and configured to extend through the opening to define a passage through the wall. The mounting structure may include a flange extending outwardly around at least a portion of a periphery of the tube member, with the flange having a plurality of apertures configured to receive fasteners to connect the flange to the wall. The tube member may have a first end connected to the flange and a second end distal from the flange. A cover can be removably connected to the second end of the tube member to obstruct the passage, where the cover is removable from the port to open the passage.

According to one aspect, the cover includes a flat base that obstructs the passage and a depending member depending from a periphery of the base and extending along an outer surface of the tube member, where the depending member is removably connected to the tube member. In one configuration, the depending member of the cover and the second end of the tube member have corresponding apertures, and a plurality of fasteners extend through the corresponding apertures to removably connect the cover to the depending member.

Other features and advantages of the invention will be apparent from the following description taken in conjunction with the attached drawings.

BRIEF DESCRIPTION OF THE DRAWINGS

To understand the present invention, it will now be described by way of example, with reference to the accompanying drawings in which.

Figure 1:
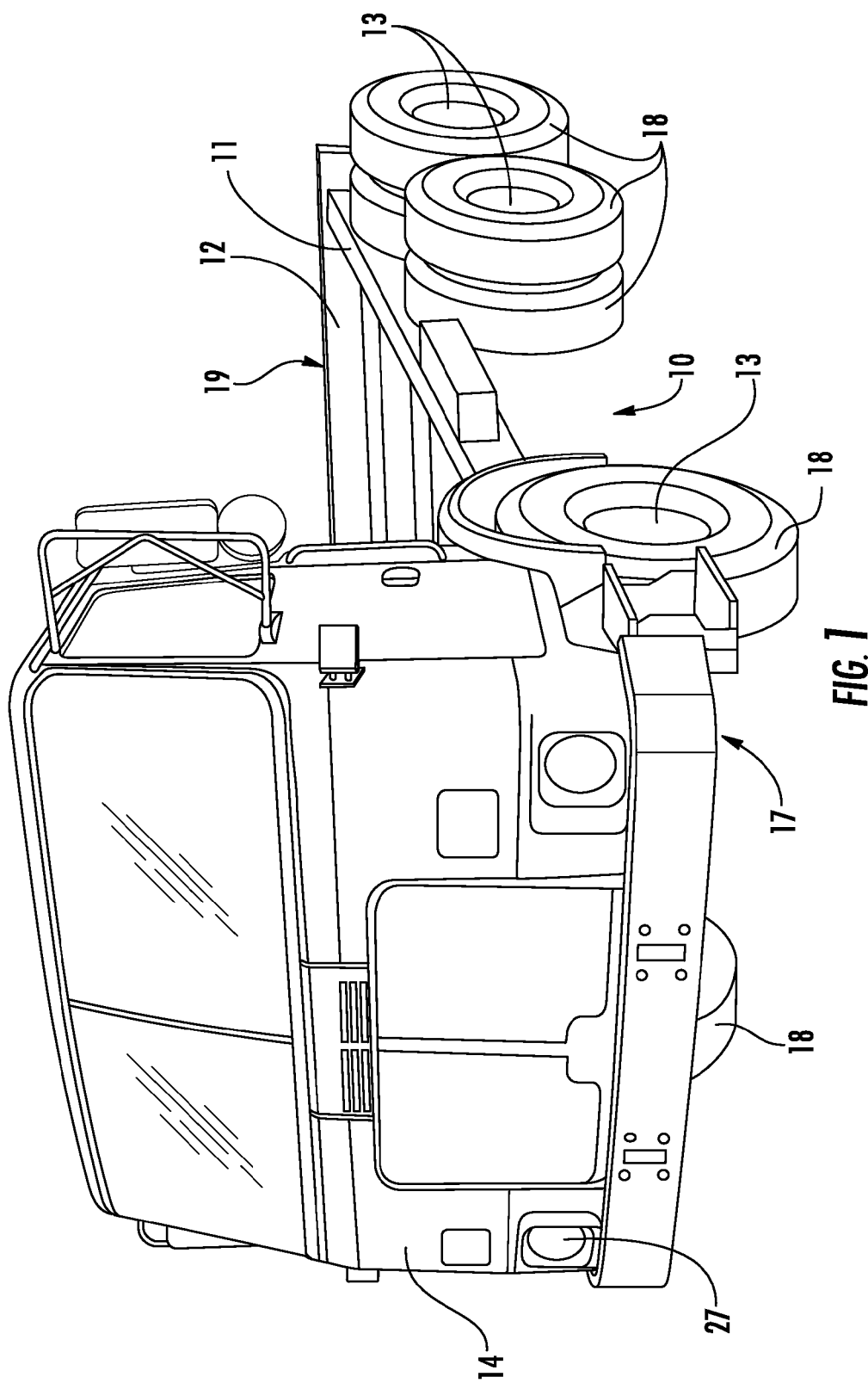
FIG. 1 is a front perspective view of a vehicle according to aspects disclosed herein.

It is understood that certain components may be removed from the drawing figures in order to provide better views of internal components.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," "primary," "secondary," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. Also, the reader is advised that the attached drawings are not necessarily drawn to scale.

Figure 2:
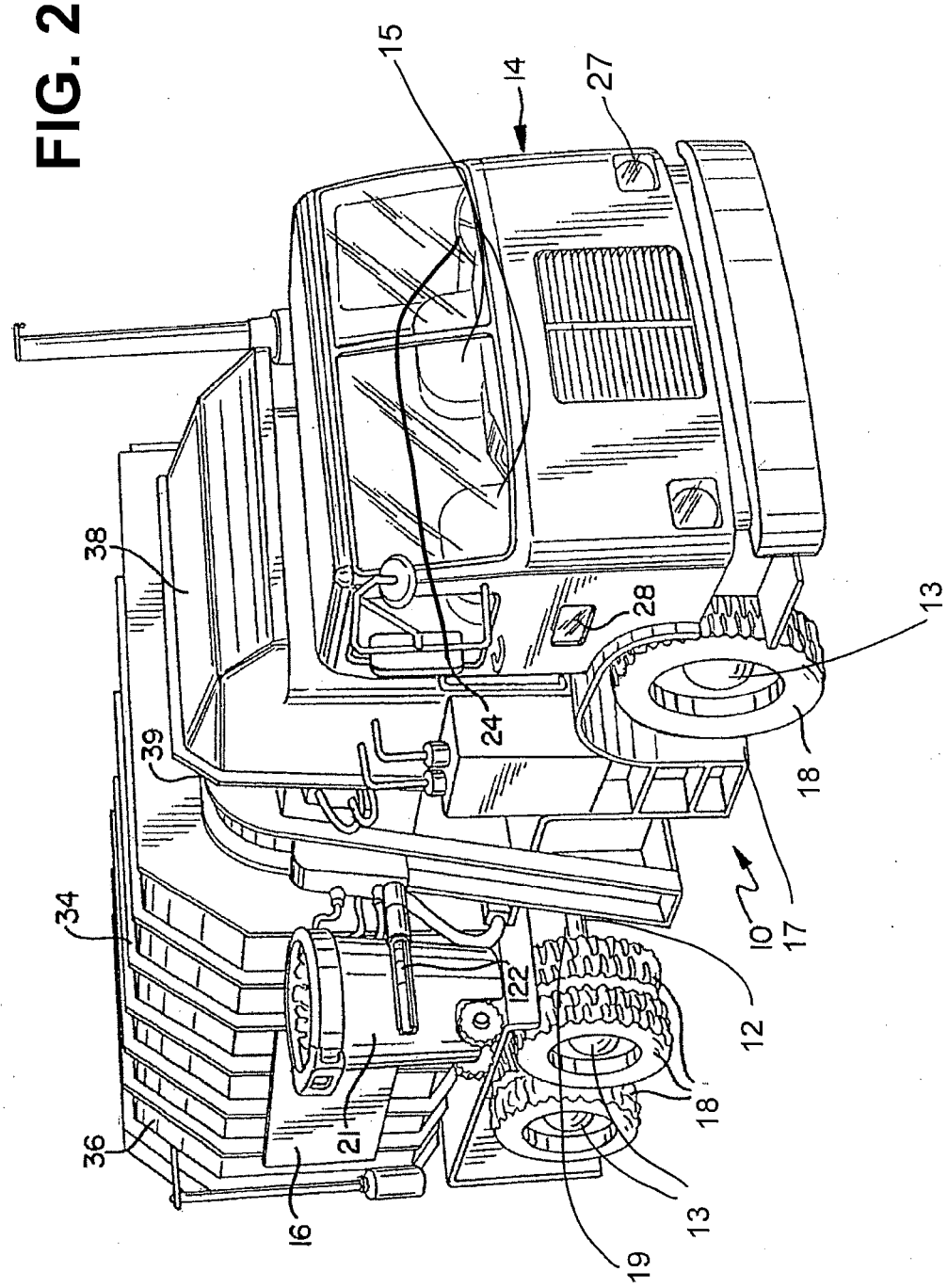
FIG. 2 is a front perspective view of a vehicle according to aspects disclosed herein, in the form of a refuse hauling truck.

Referring now in detail to the Figures, FIGS. 1-2 illustrate one embodiment of a vehicle that is usable in connection with aspects described herein, generally designated with the reference numeral 10. FIG. 1 generally illustrates an embodiment of a vehicle 10 as it typically leaves the hands of a manufacturer. The vehicle 10 may be in the form of a refuse hauling truck in one embodiment, as shown in FIG. 2, which has an appropriate body 16 and other components connected to the vehicle 10 for use as a refuse truck. It is understood that aspects and features of the present invention can be incorporated into various types of vehicles including other heavy-duty vehicles, medium-duty vehicles or light vehicles of various applications.

The vehicle 10 generally includes a chassis 12 supporting an operator cab 14 and a vehicle body 16. When assembled, the body 16 and the operator cab 14 are mounted on the chassis 12. The chassis 12 is a truck chassis and may have frame members or rail members 11, and the chassis 12 has a front portion 17 for supporting the operator cab 14 and a rear portion 19 for supporting the body 16. In one embodiment, the rail members 11 are made from steel and are generally rectangular in cross-section (e.g., a C-section). The rail members 11 may extend substantially the entire length of the chassis 12 in one embodiment, and may serve as points of support and/or connection for the body 16, the cab 14, the axles 13, and other components. As is known in the art, the chassis 12 has a front axle 13 and one or more rear axles 13 which in turn are attached to wheels 18 for movement of the chassis 12 along a surface. Additionally, the vehicle 10 has a drivetrain that includes an engine connected to a transmission (not shown) configured to transfer power to at least one of the wheels 18. The transmission may be connected to one or both rear wheels 18 in one embodiment, but it is understood that the transmission may be connected to transfer power directly to any number of the wheels 18, including, additionally or alternately, one or more of the front wheels 18 in some embodiments. It is understood that the transmission may allow shifting between several settings (e.g. D, N, R) and several gears (e.g. various forward-drive gear ratios). Additional components connected to the engine may be included as well, including an exhaust pipe, an air cleaner assembly, etc. The vehicle 10 may further include components such as a brake system (e.g., ABS), which is connected to the wheels 18 and configured to slow and stop the vehicle 10 from rolling, and lights 27, as well as other systems.

The chassis 12 may receive several different configurations of the body 16, having various functionalities. As illustrated in FIG. 2, in an exemplary embodiment for a refuse truck, the body 16 includes a storage area 34, a loading area 36, a reception area 38, an open hopper 39 and a movable arm 122. Refuse 21 may be loaded in the reception area 38 by use of the arm 122. Refuse is stored in the storage area 34 and generally compacted within the body 16. However, as understood by those of skill in the art, other bodies for different purposes such as front loaders, rear loaders, dump trucks, straight trucks, cement trucks, pumpers, sweepers and other applications may be used in connection with the present invention. Numerous components of the body 16 are capable of being adjusted, manipulated or otherwise actuated such as lifting the axles, manipulating the arm 122, opening the hopper 39, and compacting.

Figure 3:
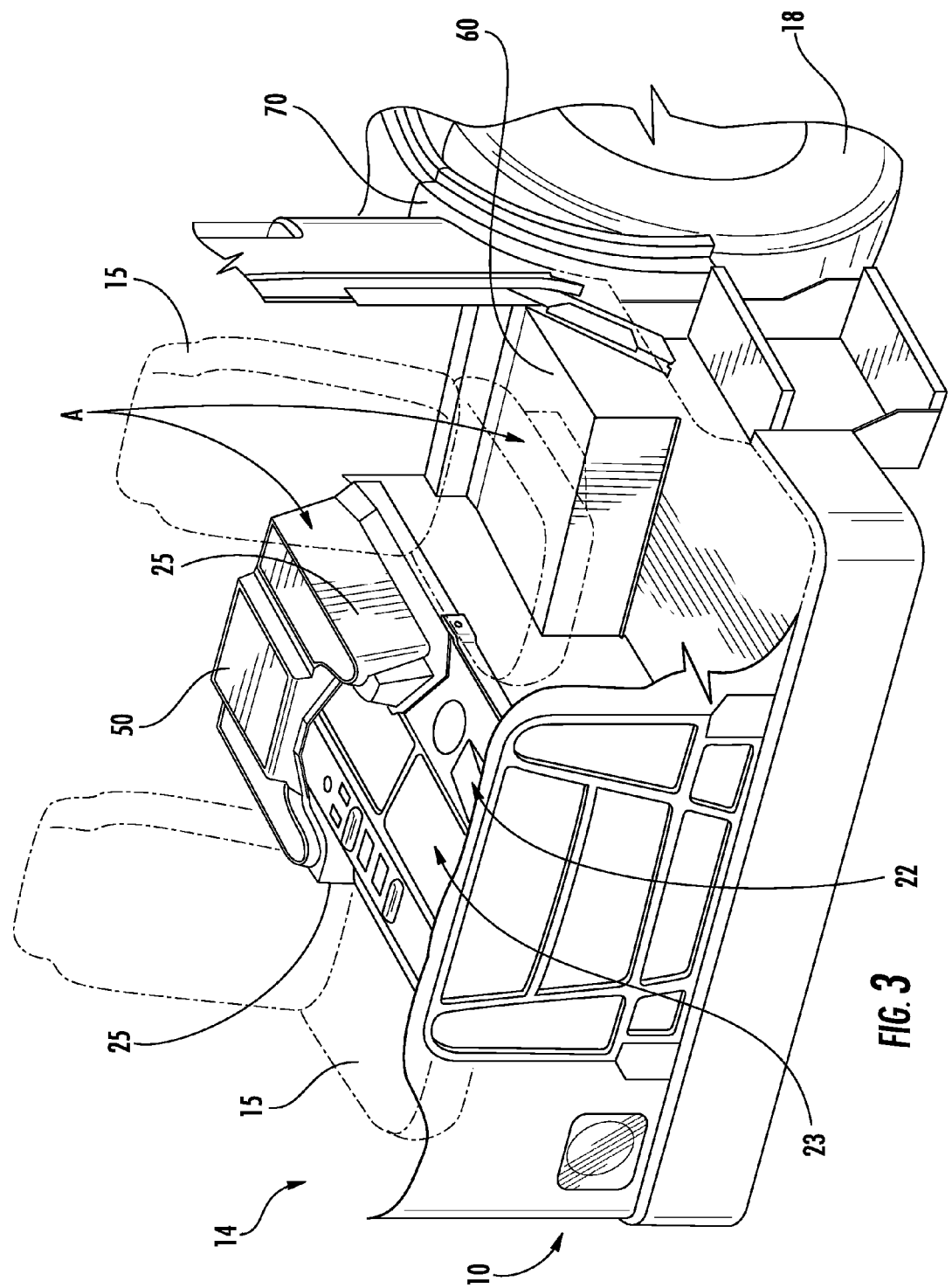
FIG. 3 is a front perspective of an operator cab of a vehicle according to aspects disclosed herein.
Figure 4:
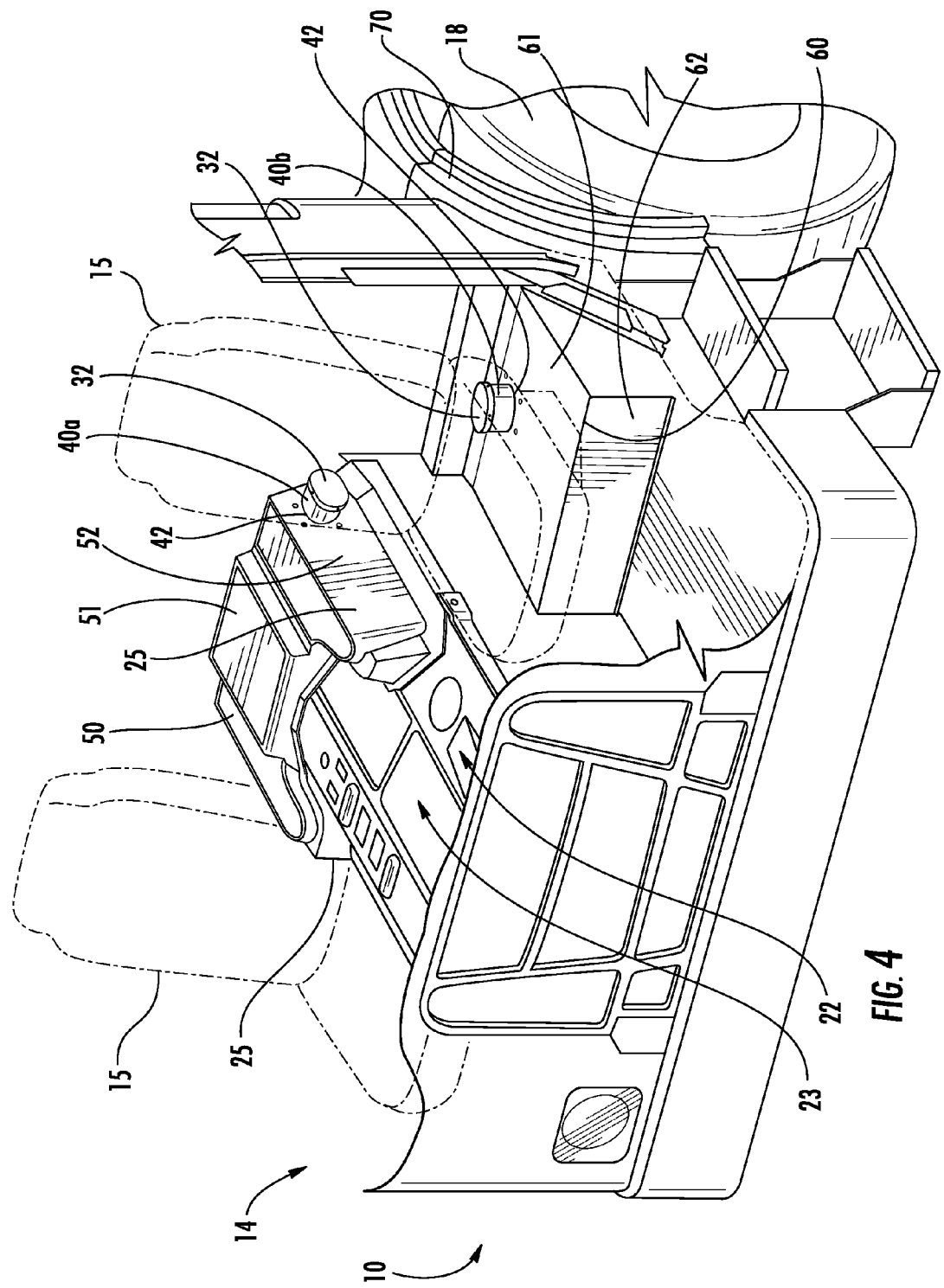
FIG. 4 is a front perspective view of the operator cab of the vehicle of FIG. 3, having ports installed in openings in the wall of the operator cab, according to aspects disclosed herein.
Figure 17:
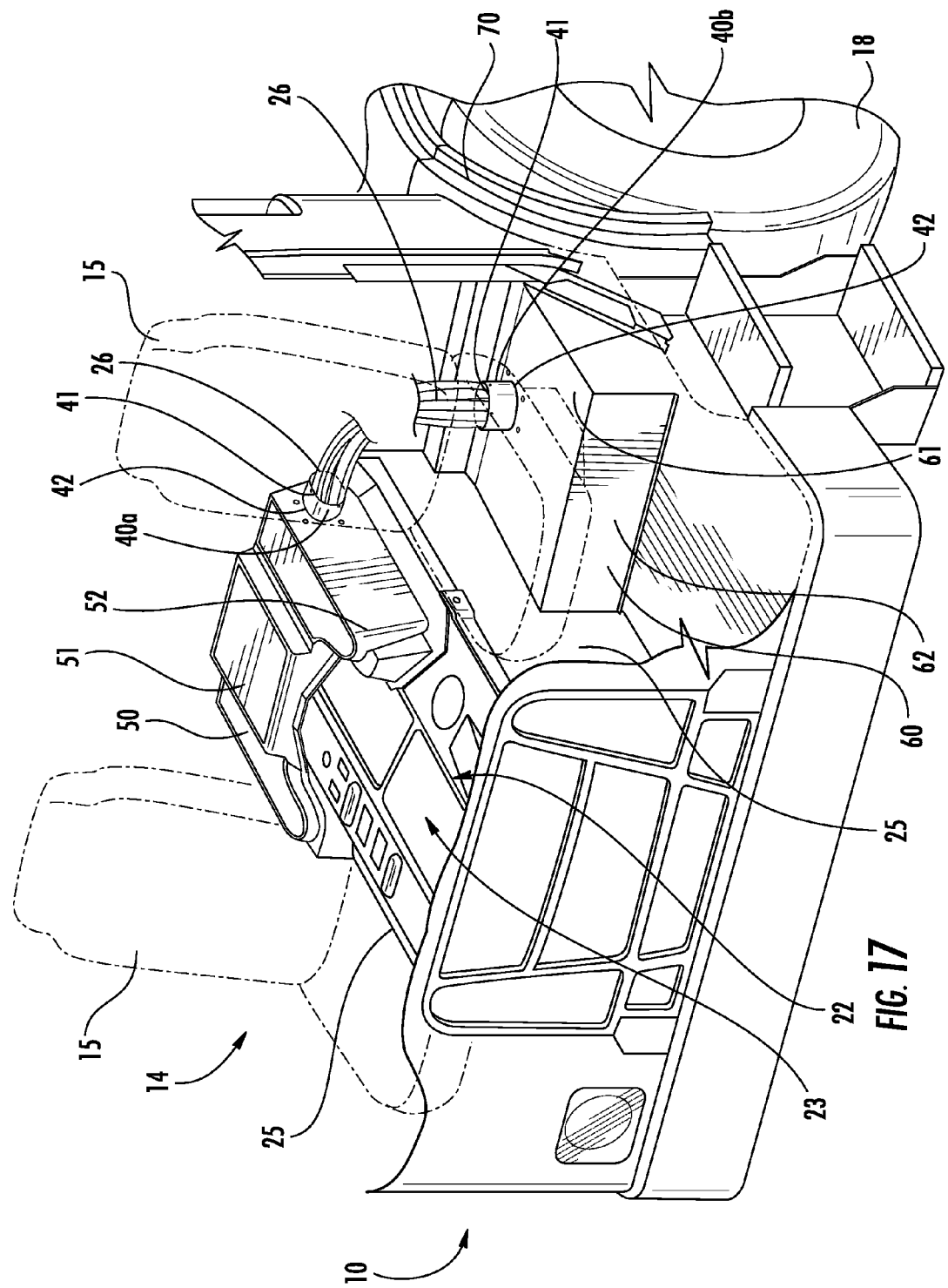
FIG. 17 is a top-front perspective view of the operator cab of FIG. 4, with conduits extending from the exterior of the operator cab, through the ports, to the interior of the operator cab.

FIGS. 3-4 and 17 illustrate the interior of one embodiment of an operator cab 14, as well as components forming the operator cab 14. The operator cab 14 generally includes passenger area, which in the embodiment illustrated, includes both a left area and a right area, either or both of which may have seats 15 or other supporting structures for operators and/or passengers. The operator cab 14 may also have doors 28 on the left and/or right sides. The vehicle 10 may be operable in a left and/or right hand drive configuration, and may be switchable between such configurations, and the left and right areas may be configured for one or more operators or passengers, depending on the drive configuration. The operator cab 14 may also contain controls 22 for operating and monitoring the vehicle 10, some of which may be located on a dashboard (not shown) or a center console 23 separating the left and right areas of the cab 14. For example, the cab 14 may include a steering wheel 24, various gauges/meters, various switches, controls, displays, etc., including for example an ignition switch, a speedometer and/or other monitors, and a transmission control (e.g. a stick or a push-button control). The controls 22 may further include actuators for a main or service braking system, which may be air brakes in one embodiment, a parking brake system, or a throttle (e.g., an accelerator), as well as controls for lifting the axles, manipulating the arm 122, opening the hopper 39, compacting, etc. In building the vehicle 10, various conduits must pass from the exterior to the interior of the cab 14, as described above. Body builders typically create passages for such conduits behind one or both seats 15 and/or through one or both sides 25 of the console 23, in the areas indicated by (A) in FIG. 3. Passing through the wall of the cab 14 allows the conduits to connect to one or more exterior components of the vehicle 10 that are outside the cab 14 and to one or more interior components of the vehicle 10 that are on the interior of the cab 14.

FIGS. 4-6 and 17 illustrate one embodiment of an operator cab 14 that is provided with one or more ports 40 to create passages 41 for conduits 26 to pass through the walls of the operator cab 14, to the interior of the cab 14. In this embodiment, the cab 14 includes three ports 40, one behind the left-hand seat 15 (i.e., the driver's seat in a left-hand driving configuration) and two on the sides 25 of the console 23. It is understood that FIGS. 3-4 are illustrated from a viewpoint at the front of the vehicle 10, and that the "left hand seat 15" would therefore be located on the right side in FIGS. 3-4. In other embodiments, the cab 14 may have a different number of ports 40 and/or may have one or more ports 40 in other locations. For example, a port 40 may be included behind the right-hand seat 15, in addition to or instead of the port 40 behind the left-hand seat 15. As another example, the console 23 may have only a single port 40 on the left-hand or right-hand side 25. Further configurations are possible.

Figure 5:
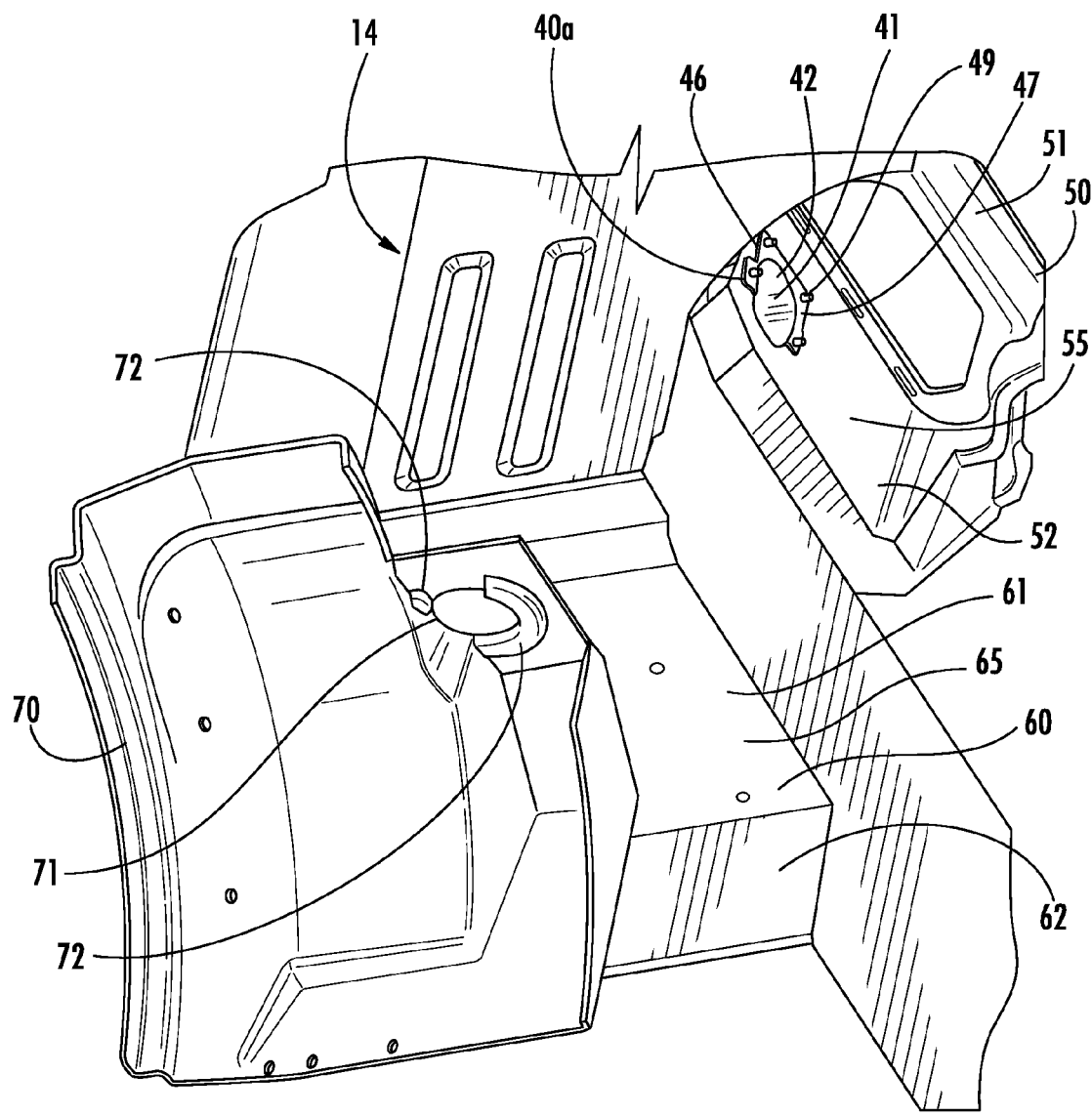
FIG. 5 is a bottom-rear perspective view of an underside of the operator cab of FIG. 4, with a fender in place beneath the operator cab.
Figure 6:
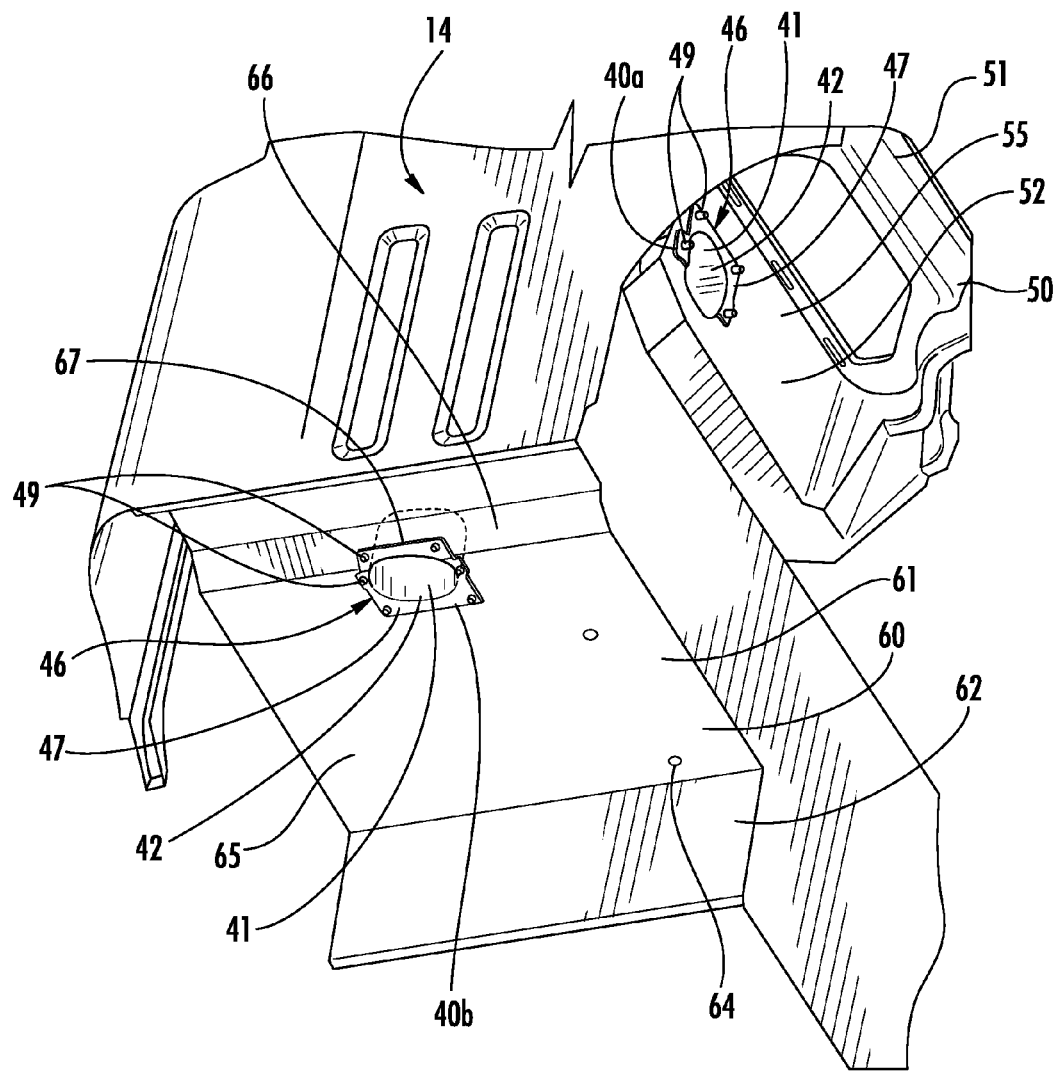
FIG. 6 is a bottom-rear perspective view as shown in FIG. 5, with the fender removed to illustrate additional detail.
Figure 7A:
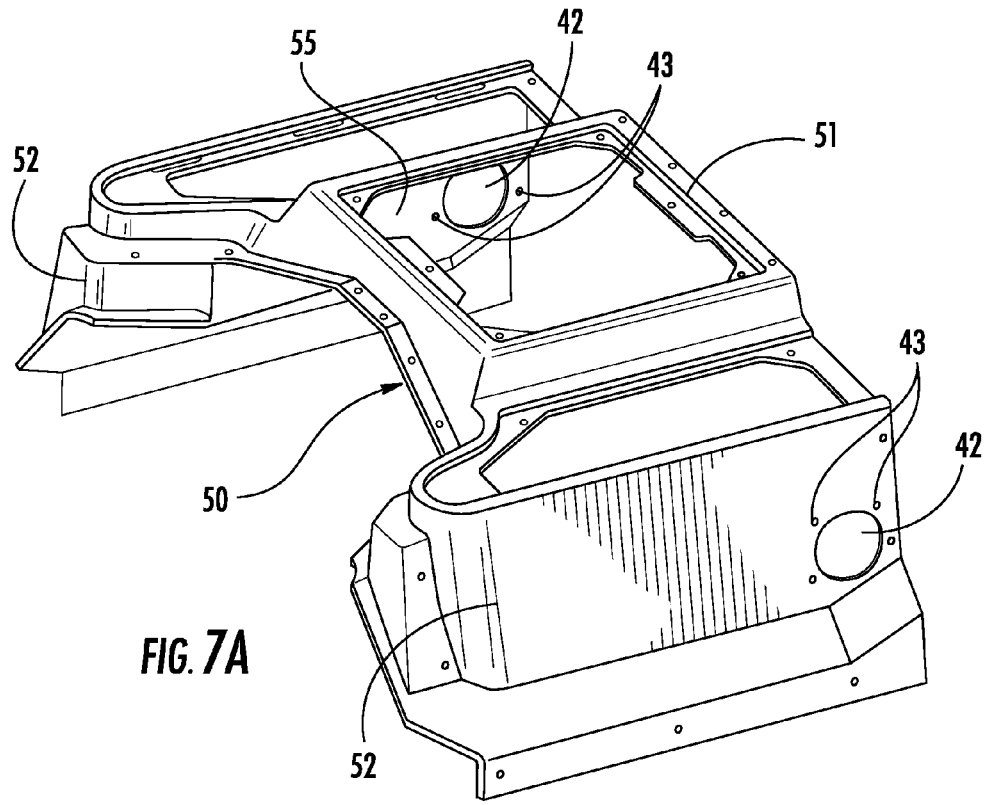
FIG. 7A is a top-front perspective view of one embodiment of a console panel configured for use in the operator cab of FIGS. 4-6, according to aspects disclosed herein.
Figure 7B:
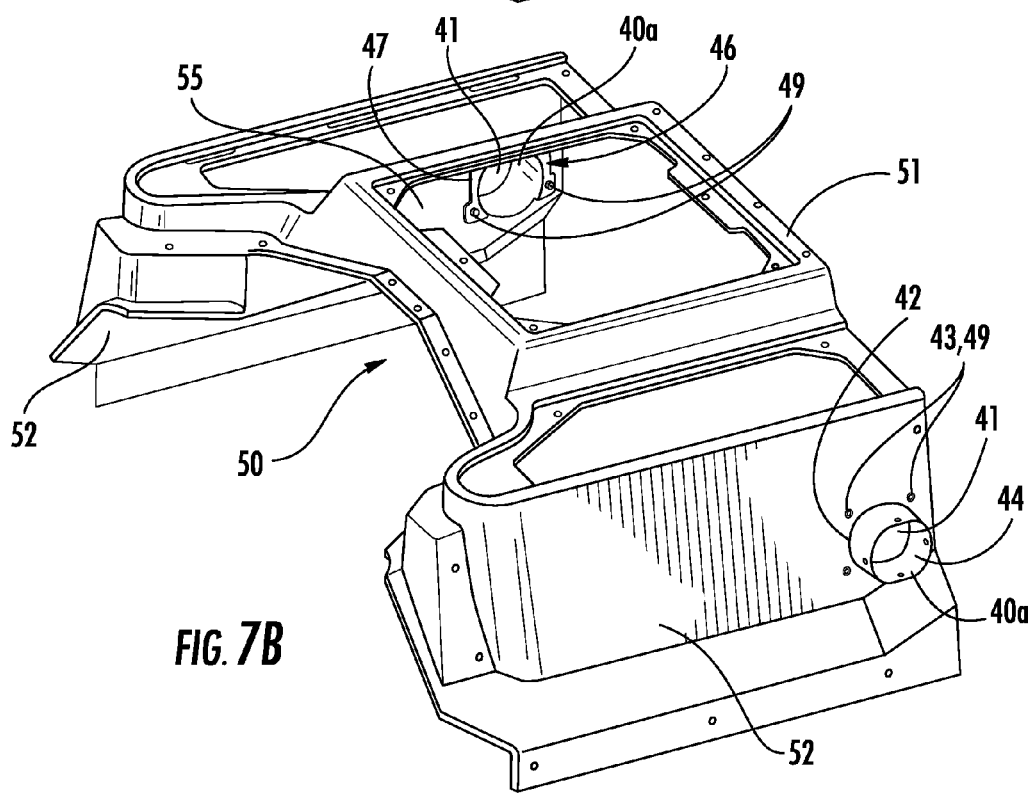
FIG. 7B is a top-front perspective view of the console panel of FIG. 7A, with two ports installed in openings in the console panel, according to aspects disclosed herein.
Figure 8:
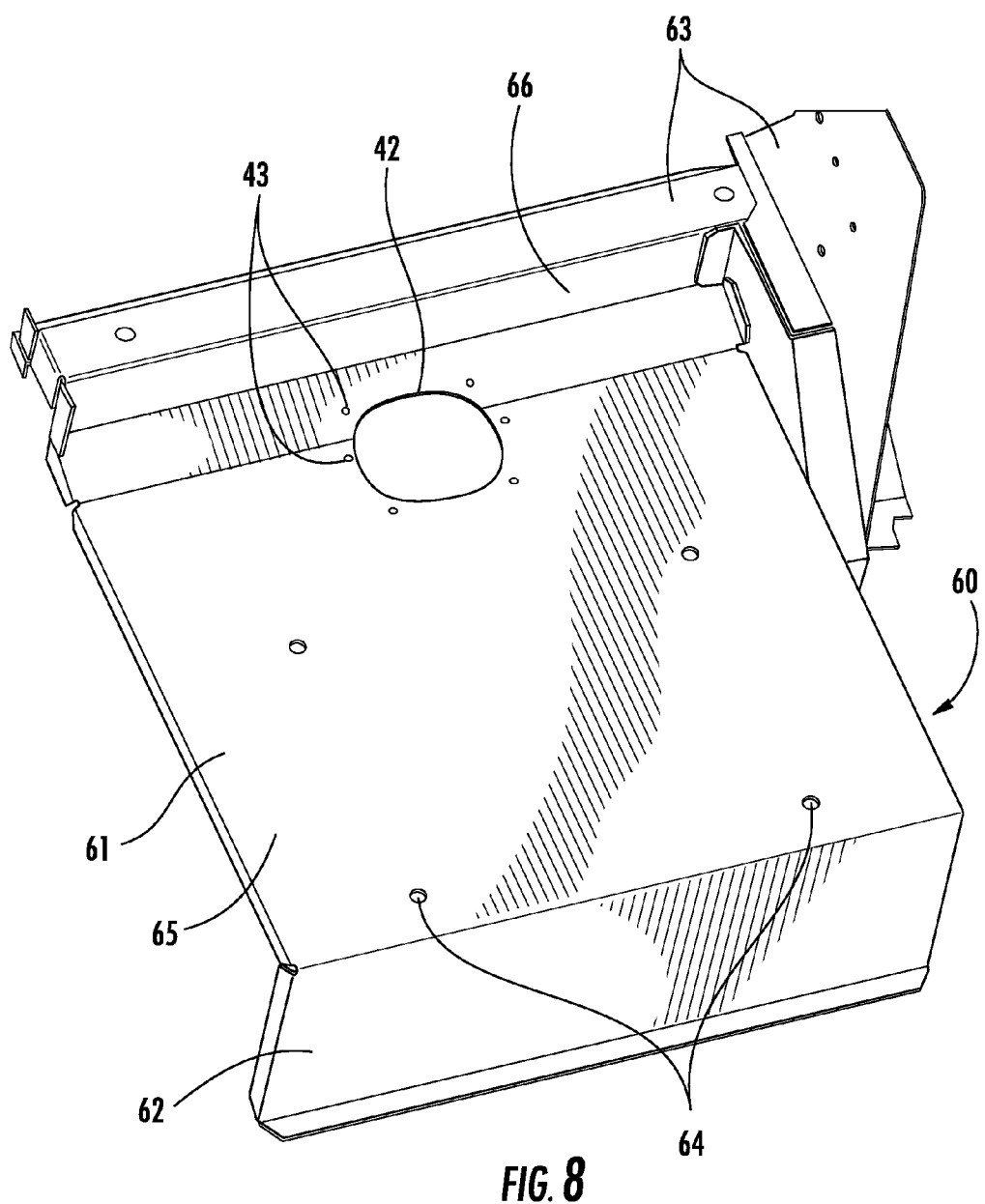
FIG. 8 is a top-front perspective view of one embodiment of a floor panel configured for use in the operator cab of FIGS. 4-6, according to aspects disclosed herein.

The wall of the cab 14 may be provided with one or more openings 42 in various portions of the wall, each configured to allow the respective port 40 to pass through the panel. For example, in the embodiment of FIGS. 4-6, an opening 42 is defined in a console panel 50 that forms at least the rear part of the console 23, and another opening 42 is defined in a floor panel 60 that forms at least a portion of the floor of the cab 14 in the rear area on the left-hand side and supports the base of the left-hand seat 15. The openings 42 illustrated in FIGS. 4-6 are in communication with both the exterior and the interior of the operator cab 14. FIGS. 7A-B illustrate an embodiment of the console panel 50, which has a top portion 51 configured to form at least a portion of the top surface of the console 23 and legs 52 depending from the top portion 51 to form at least portions of the sides 25 of the console 23. The console panel 50 illustrated in FIGS. 7A-B has two openings 42 are defined within the legs 52 in this embodiment, approximately in symmetrical locations. In another embodiment, the console panel 50 may have only one opening 42 located as shown in FIGS. 4-6. FIG. 8 illustrates an embodiment of the floor panel 60, which includes a support surface 61 with mounts 64 for supporting the seat 15, a step portion 62 depending from the front of the support surface 61 below where the seat 15 is mounted, and several mounting flanges or other structures 63 configured for connecting the floor panel 60 to adjacent structures. The opening 42 is defined within the support surface 61 in this embodiment, in an area behind the mounts 64 for connection to the seat 15. The floor panel 60 in FIG. 8 also has an inclined portion 66 near the rear edge, and the opening 42 is positioned along the juncture between the support surface 61 and the inclined portion 66. Each opening 42 in these embodiments is provided with a plurality of apertures 43 surrounding the opening 42, for connection to fasteners, as described in greater detail below. The openings 42 and apertures 43 may be formed during manufacture of the panels 50, 60, so that any painting or other coating applied to the panels 50, 60 prior to assembly will be applied to the surfaces and edges forming the openings 42 and the apertures 43. Further, in one embodiment, the openings 42 may be created in locations that are non-structurally critical to the panel 50, 60, as well as in shapes and sizes that do not significantly weaken the panel 50, 60. These locations, shapes, and sizes may depend on the construction of the panel 50, 60 and/or the typical loading that is put on the panel 50, 60 during use. It is understood that either of the panels 50, 60 may be formed from multiple pieces connected together, and that one or more of such pieces may include one or more openings 42. In other embodiments, the panels 50, 60 may have openings 42 that are different in number, location, shape, size, etc. In further embodiments, different types of panels may additionally or alternately include openings 42 and/or be configured to engage the ports 40 described herein.

Figure 10:
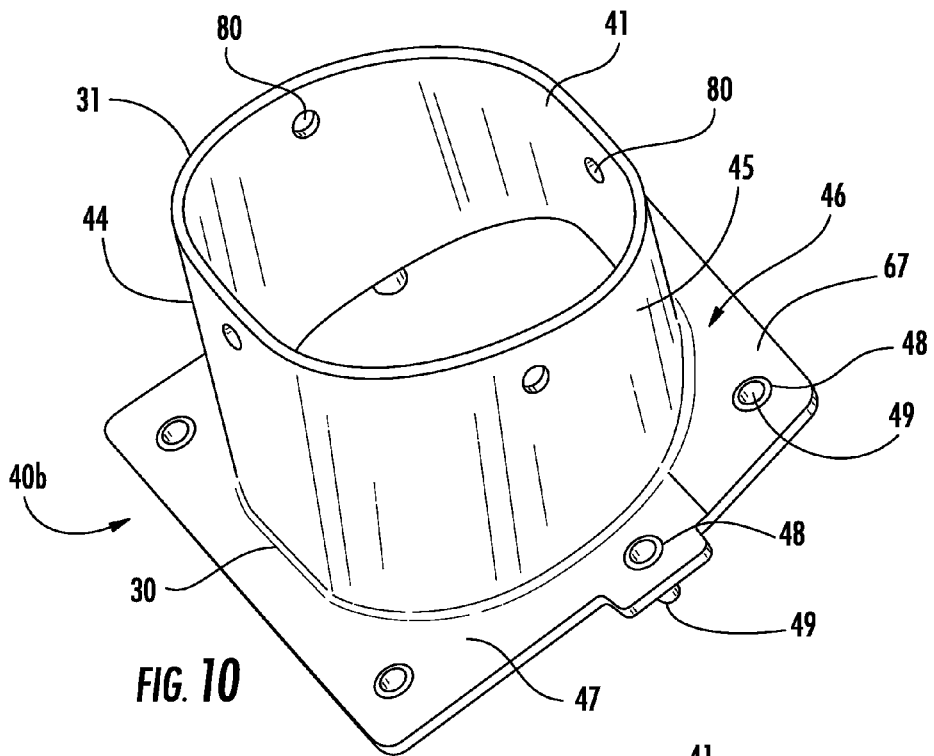
FIG. 10 is a perspective view of one embodiment of a port configured for use with the floor panel of FIG. 8.
Figure 11:
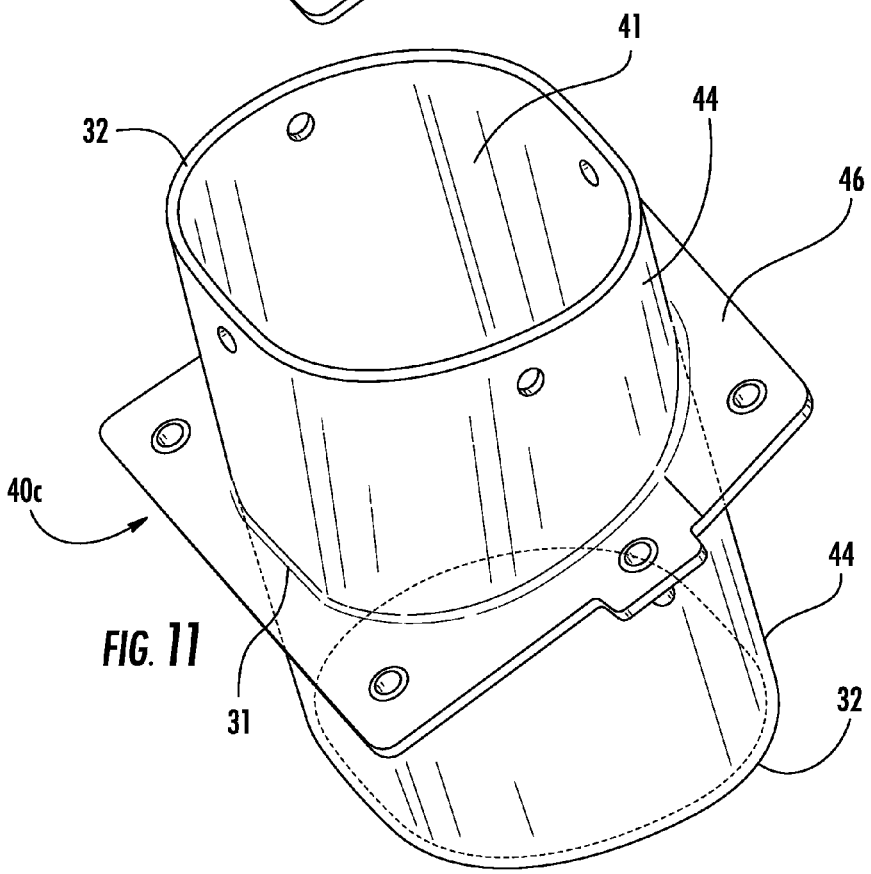
FIG. 11 is a perspective view of another embodiment of a port configured for connection to the wall of an operator cab, according to aspects disclosed herein.
Figure 12:
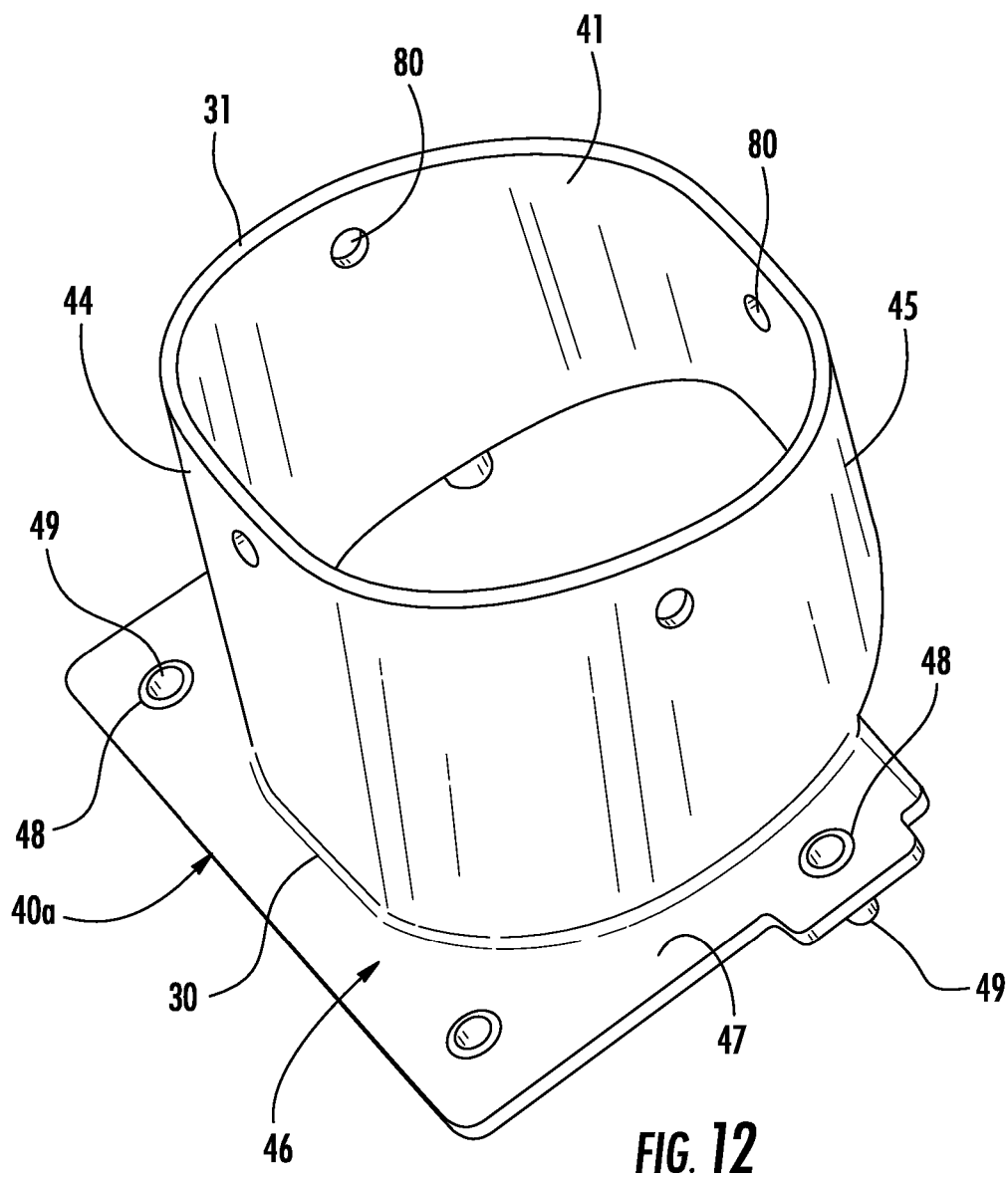
FIG. 12 is a perspective view of one embodiment of a port configured for use with the console panel of FIGS. 7A-B.
Figure 13:
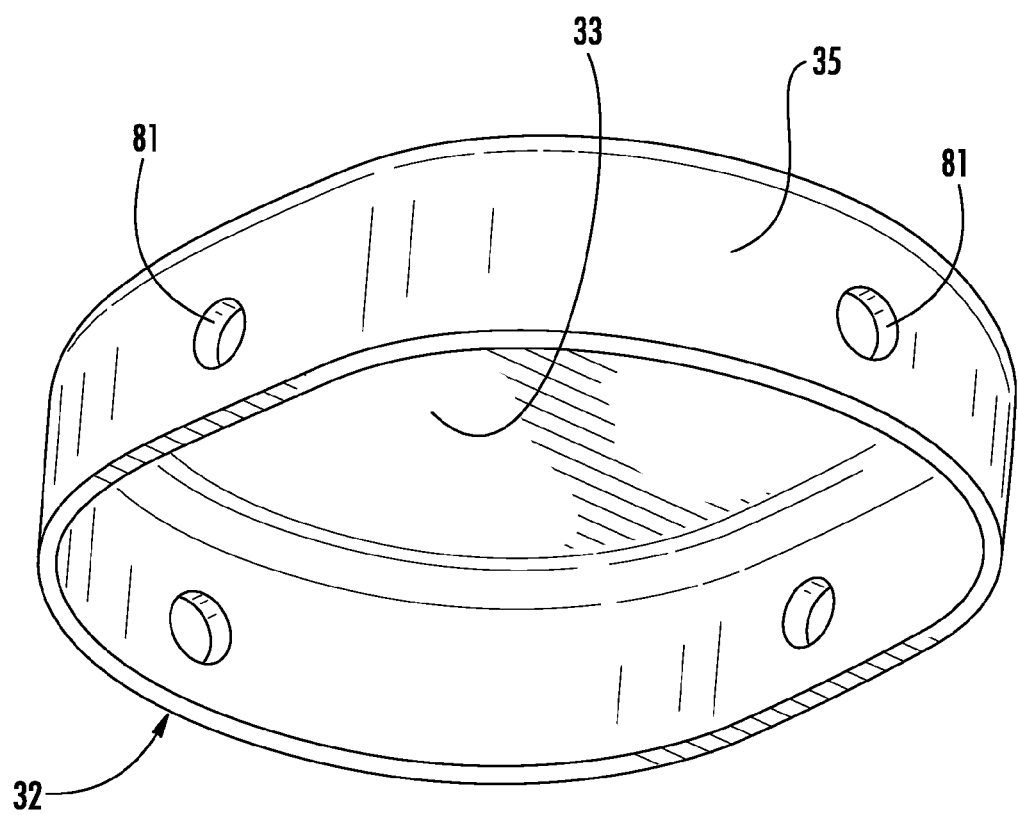
FIG. 13 is a perspective view of one embodiment of a cover configured for use with the ports of FIGS. 10-12.
Figure 14:
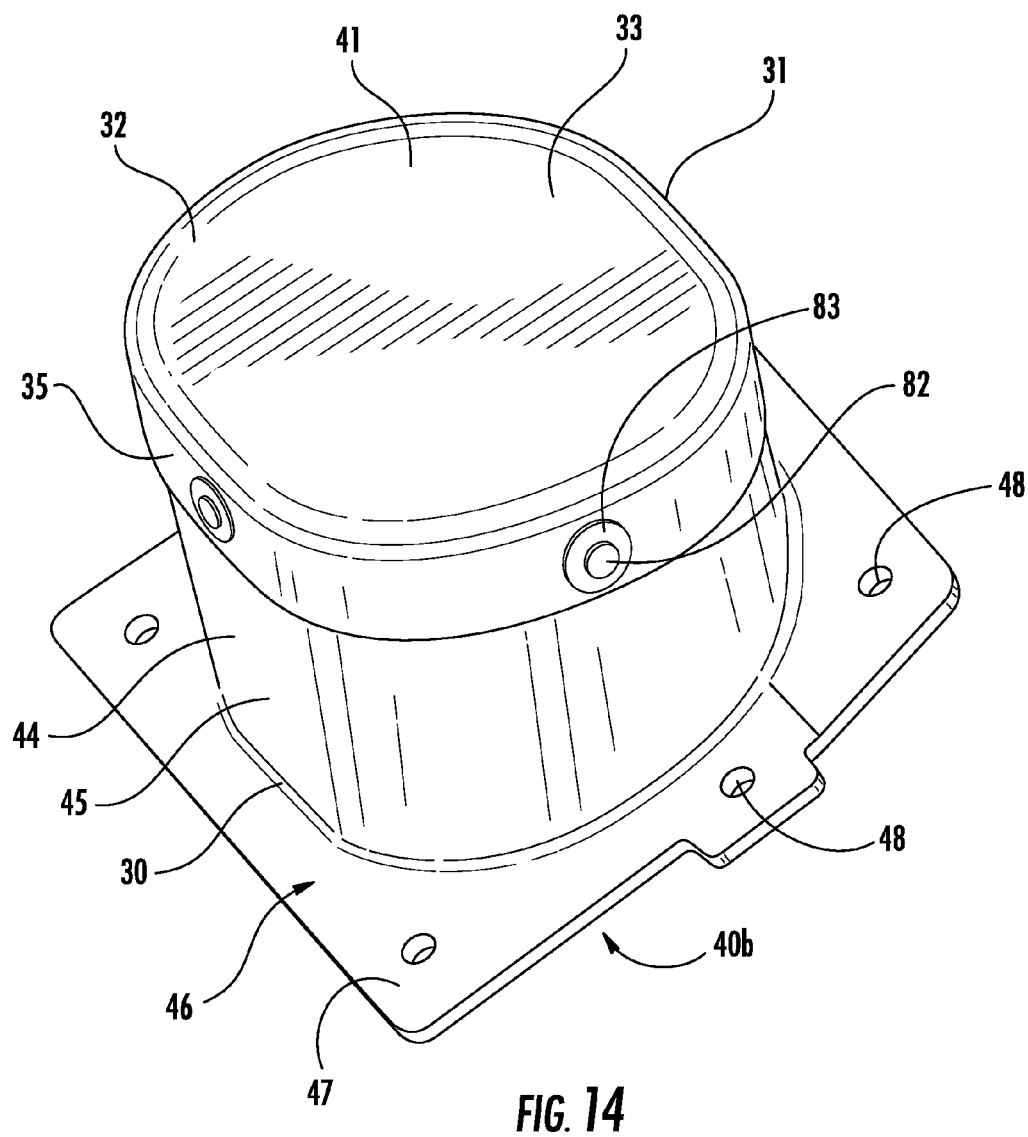
FIG. 14 is a perspective view of the cover of FIG. 13 connected to the port of FIG. 10.
Figure 15:
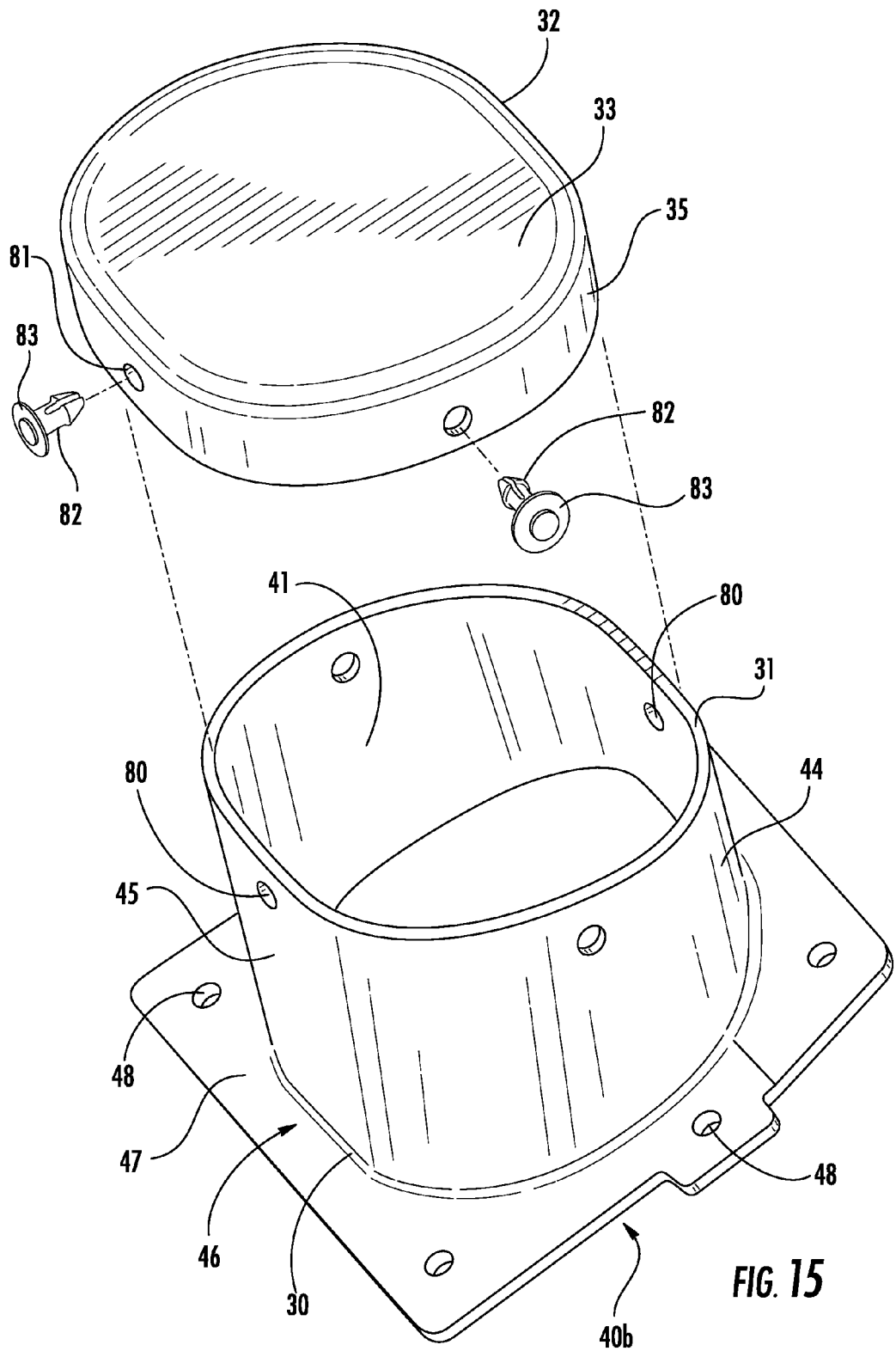
FIG. 15 is an exploded perspective view of the cover of FIG. 13 being connected to the port of FIG. 10 as illustrated in FIG. 14, by use of fasteners.
Figure 16:
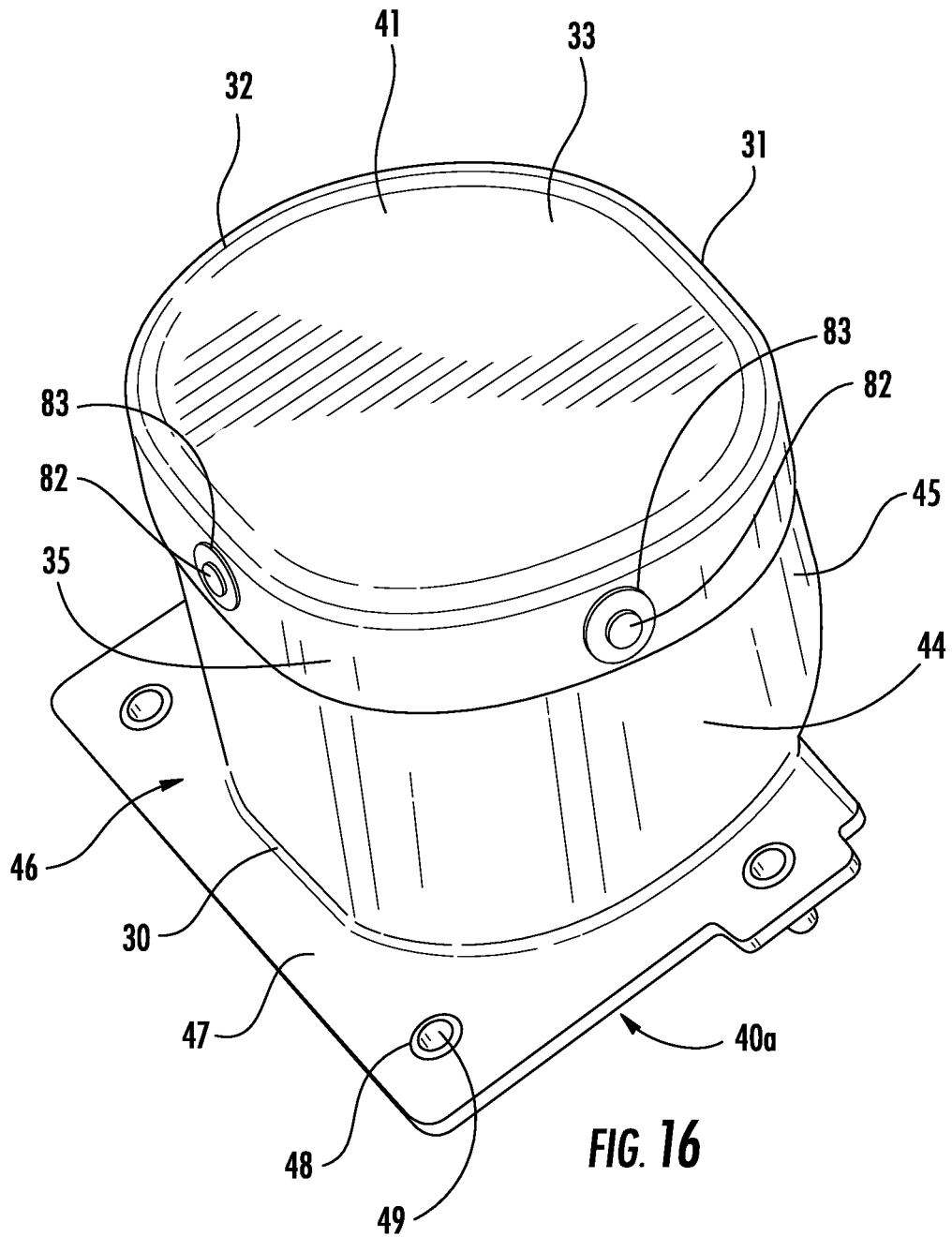
FIG. 16 is a perspective view of the cover of FIG. 13 connected to the port of FIG. 12.

FIGS. 10-16 illustrate embodiments of the ports 40 used in the operator cab 14 shown in FIGS. 4-6. FIG. 12 illustrates one embodiment of a port 40a configured for connection to the console panel 50, and FIG. 10 illustrates another embodiment of a port 40b configured for connection to the floor panel 60, as illustrated in FIGS. 4-6. Each port 40 includes a tube member 44 with a cylindrical wall 45 defining a passage 41 and a mounting structure 46 connected to the tube member 44. The mounting structure 46 in this embodiment includes a flange 47 extending outward from the tube member 44 around at least a portion of the periphery of the tube member 44, as well as a number of apertures 48 formed in the flange 47 for receiving fasteners 49 therethrough. The floor port 40b has a flange 47 that extends around the entire periphery of the tube member 44 in the embodiment illustrated in FIG. 12. Additionally, the flange 47 of the floor port 40b has an inclined portion 67, which is positioned at approximately the same angle as the inclined portion 66 of the floor panel 60. The console port 40a has a flange 47 that extends around only a portion (e.g., around a majority) of the periphery of the tube member 44 in the embodiment illustrated in FIG. 10, to provide better fit with the surface contours of the console panel 50. The ports 40 may be formed from a high strength plastic or other polymer material (including fiber-reinforced materials) in one embodiment, but may be formed from a different material or combination of materials in another embodiment.

As illustrated in FIGS. 4-6, the ports 40 are configured to be mounted to the panels 50, 60, such that the mounting structure 46 is connected to the exterior surfaces 55, 65 of each panel 50, 60, and the tube member 44 extends upward through the opening 42 and into the operator cab 14. It is understood that "exterior surface" is used in this sense to refer to surfaces that are on the exterior side of the cab 14, rather than on the interior side, and that "exterior surface" in this usage does not necessarily imply that the surface forms part of the outer surface of the vehicle 10 or is otherwise exposed. As seen in FIG. 6, the inclined portion 67 of the floor port 40a is configured to be connected to the exterior surface 65 of the inclined portion 66 of the floor panel 60. The fasteners 49 extend through the apertures 48 in the mounting structures 46 and through the apertures 43 in the panels 50, 60 to mount the ports 40. The fasteners 49 are rivets or screws in the embodiment illustrated, however other types of fasteners or other connecting structures may be used in other embodiments, such as bolts, anchors, flexible tabs, complementary interlocking structures, adhesives or other bonding materials, etc. In other embodiments, the port 40 may be mounted differently, such as by the tube member 44 extending downward, rather than through the opening 42, or such as by the mounting structure 46 being connected to the top side of the panel 50, 60, with the tube member 44 either extending upward or downward through the opening 42, or by using another configuration.

The tube members 44 in the embodiments shown in FIGS. 10-16 have an elongated and/or generally oval shape (i.e., elliptical, obround, etc.), and may be different shapes in other embodiments. The openings 42 have shapes that are similar and/or complementary to the exterior shape of the tube member 44, so that the openings 42 and the tube members 44 fit tightly together. This configuration serves to secure the ports 40 in place and to resist ingress of environmental substances around the ports 40. The tube member 44 of each port 40 extends from the flange 47 at an oblique (i.e., non-perpendicular) angle with respect to the flange 47, such that the height of the tube member 44 is smaller on one side and larger on the other. This configuration permits the passage 41 to extend in a desired direction that may not be perpendicular to the surface of the panel 50, 60 around the opening 42. For example, in the embodiment shown in FIGS. 4 and 17, the tube members 44 of the two ports 40 are angled to direct the conduits 26 so as to facilitate the conduits 26 extending from one port 40 to the other. Additionally, the mounting structures 46 in the embodiments illustrated in FIGS. 10 and 12 are connected at the ends of the tube members 44, such that each tube member 44 has a first end 30 connected to the mounting structure 46 and a second end 31 located distal from the mounting structure 46. The tube member 44 in one embodiment has a length measured from the mounting structure 46 to the distal end 31 that is greater than the thickness of the wall through which it passes. The length of the tube member 44 may be significantly greater than the wall thickness, such as having a length of at least 5 cm, or about 7.5 cm, in various embodiments. It is understood that the length of the tube member 44 may depend on the thickness of the structure that the tube member 44 extends through. In the embodiment of FIGS. 4-6, the tube member 44 extends through only a single panel 50, 60; however in other embodiments, the tube member 44 may extend through multiple panels or other structures having greater thickness.

In another embodiment of a port 40c, illustrated in FIG. 11, portions of the tube member 44 may extend in both directions from the mounting structure 46. In this embodiment, the lengths and peripheral shapes/dimensions of the portions of the tube member 44 on the top and bottom sides of the mounting structure 46 may be equal or different, as desired.

The port 40 may also have a cover 32 that is configured to removably cover the port 40 and obstruct the passage 41. In the embodiments of FIGS. 13-16, each port 40 has a cover 32 that is configured to be connected to the distal end 31 of the tube member 44 to cover the distal end 31. The covers 32 in FIGS. 13-16 each have a flat base 33 that obstructs the passage 41, with a depending member 35 extending downward around at least a portion of the periphery of the base 33. The depending member 35 in the embodiment of FIGS. 13-16 is in the form of a cylindrical flange that depends from the entire periphery of the base 33. The cylindrical depending member 35 in this embodiment is sized to be the same or slightly larger than the outer periphery of the distal end 31 of the tube member 44, in order for the distal end 31 to be received within the periphery of the depending member 35, so that the depending member 35 extends downward around the outside of the distal end 31. In another embodiment, the depending member 35 may depend from only a portion of the periphery of the base 33, such as being formed as one or more tabs distributed around the periphery of the base 33. Additionally, both the tube member 44 and the cover 32 have apertures 80, 81 that receive fasteners 82 to removably connect the cover 32 to the port 40. In the embodiments illustrated in FIGS. 10-16, the tube member 44 has apertures 80 around the distal end 31, and the cover 32 has apertures 81 around the depending member 35 that are configured to be aligned with the apertures 80 of the tube member 44. The non-circular shapes of the cover 32 and the tube member 44, as well as the symmetrical placement of the apertures 80, 81, ensures that the apertures 80, 81 will be aligned when the cover 32 is placed in position. The fasteners 82 can then be inserted through the apertures 80, 81. The fasteners 82 may be flexible fasteners in one embodiment, such as plastic rivets or other structures with flexible tabs, in order to permit the fasteners 82 to be removed and/or connected by hand. The fasteners 82 may have flexible washers or grommets 83 around them as well. In other embodiments, other types of fasteners or other removable connecting structure may be used to connect the cover 32 to the tube member 44. For example, the cover 32 and the tube member 44 may have complementary tab-and-slot arrangements or other complementary interlocking structures. As another example, in the case of a circular tube member 44 and cover 32, a threaded or rotational locking mechanism may be used. Further types of removable connecting structures may be used in other embodiments.

The ports 40 can be installed in the operator cab 14 by connecting the mounting structures 46 to the respective panels 50, 60, as illustrated in FIGS. 4-6. The mounting structures 46 in this embodiment are positioned in contact with the exterior surfaces 55, 65 of the panels 50, 60 around the openings 42, so that the tube members 44 extend through the openings 42 to the interior of the cab 14. The fasteners 49 are then connected through the apertures 43, 48 of the panels 50, 60 and the mounting structures 46, to mount the ports 40 to the panels 50, 60. If the port 40 is desired to be used, the cover 32 can be removed to open the passage 41. Conduits 26 can then be extended through the passages 41 defined by the ports 40, as shown in FIG. 17, for connection to components inside and outside the cab 14. In the embodiment of FIG. 17, one or more of the conduits 26 may extend through the floor port 40*b* and connect to components in the interior of the cab 14 (e.g., behind the seat 15), while one or more other conduits 26 may extend through the floor port 40*b* and into the console port 40*a* for connection to components housed within the console 23. Silicone or other sealant (not shown) may be deposited within the passage 41 and around the conduit(s) 26 after all desired conduits 26 have been put into place, in order to provide environmental sealing. If the port 40 is not desired to be used for passage of conduits 26, the cover 32 can remain in place to resist ingress of environmental substances.

Figure 9:
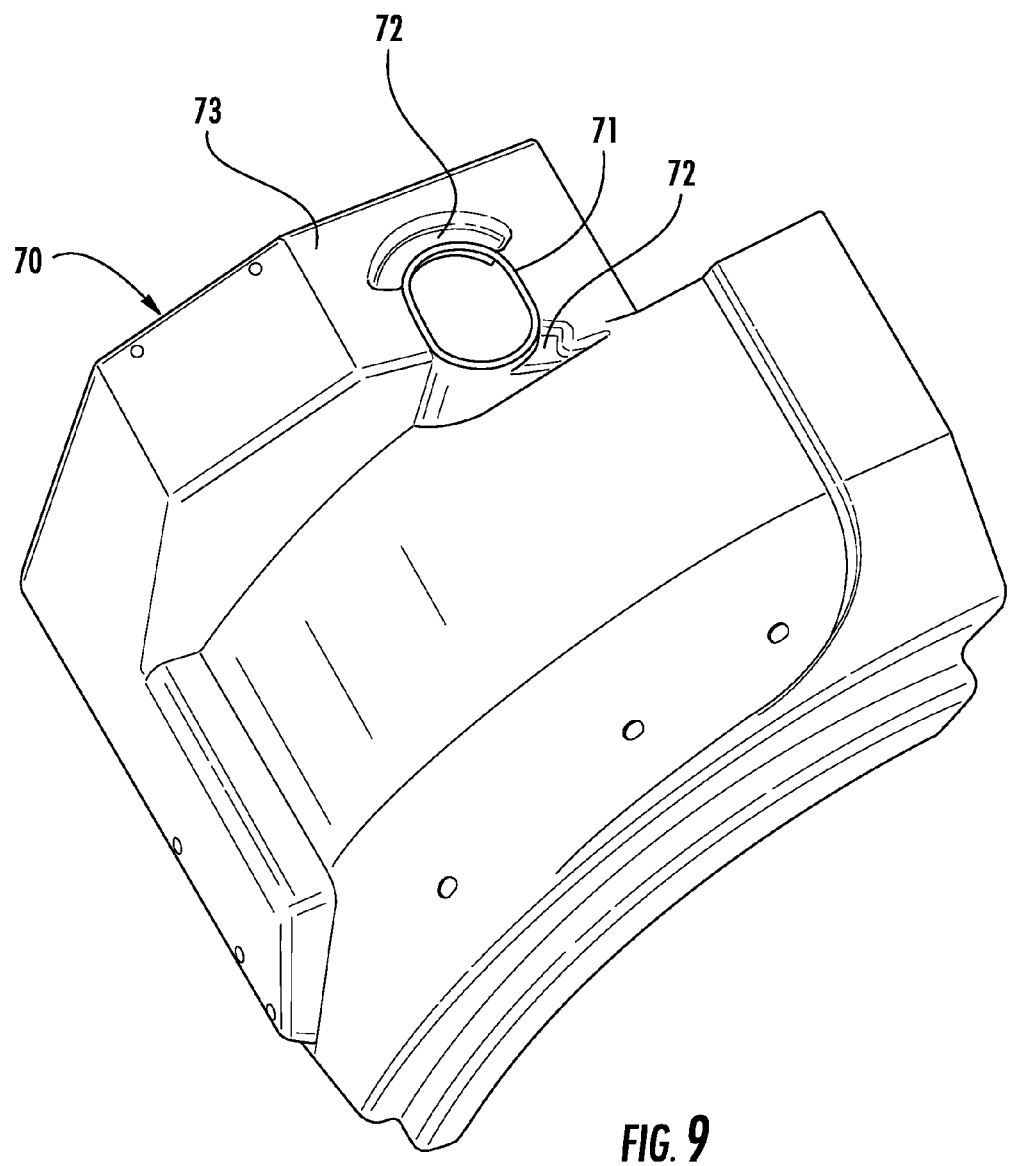
FIG. 9 is a top-front perspective view of one embodiment of a fender configured for use in connection with the operator cab of FIGS. 4-6, according to aspects disclosed herein.

FIGS. 5-6 illustrate views of the underside of the operator cab 14, with the ports 40 connected to the panels 50, 60 as described herein. As illustrated in FIG. 5, the floor panel 60 has a fender 70 positioned immediately below it, and the fender 70 also has an opening 71 to provide passage of the conduits 26 therethrough. FIG. 9 illustrates one embodiment of the fender as illustrated in FIG. 5. In this embodiment, the opening 71 of the fender 70 is aligned with the passage 41 defined by the port 40*b* and the opening 42 in the floor panel 60 to provide a single continuous passage. Additionally, the fender 70 has one or more recesses 72 in the top surface 73 around the opening 71, to accommodate the ends of the fasteners 49, in the embodiment shown in FIGS. 5 and 9. Two recesses 72 are illustrated in FIGS. 5 and 9, however is understood that the fender 70 may have a different number and/or configuration of recesses 72 if different configurations of fasteners 49 are used. This configuration permits the top surface 73 of the fender 70 to be positioned proximate to or in contact with the flange 47 of the port 40*b* and/or the exterior surface 65 of the floor panel 60.

In another embodiment, the ports 40 may not be used in connection with the panels 50, 60, and passages for conduits 26 to extend through the walls of the cab 14 may be provided by the openings 42 in the panels 50, 60 and/or the opening 71 of the fender 70. In this embodiment, a grommet or other protective structure may be used around some or all of the openings 42, 71. Additionally, silicone or other sealants may be applied to some or all of the openings 42, 71 after the conduits 26 are extended through the passages formed by the openings 42, 71. In a further embodiment, the ports 40 may be used in connection with fewer than all of the openings 42 in the panels 50, 60.

The embodiments of the vehicle structures (e.g., the panels 50, 60 and the fender 70) and/or the ports 40 described herein provide benefits and advantages over existing designs. Constructing the openings in the panels and the fender during original manufacturing, rather than cutting the openings after manufacture, provides several advantages. For example, the original manufacturer is able to design the openings in locations that are not structurally critical and to design the shapes and sizes of the openings in a structurally sound manner, in order to avoid weakening the components. Similarly, the original manufacturer is also able to perform quality testing on the components after the openings are created, such as strength testing, in order to assist in ensuring maximum quality. As another example, creating the openings during manufacturing allows the edges of the openings to be painted and/or covered with other coatings to improve the corrosion resistance of the edges. As a further example, creating the openings during manufacturing eliminates the occurrence of other parties (e.g., body builders) drilling such holes blind, and also saves time for such other parties. Additionally, the use of the ports as described herein provides passages for conduits to enter or exit the operator cab, which can be selectively utilized or closed off as desired for a particular application. Further, the construction of the ports, such as the length of the tube member, provides a longer path for environmental substances to travel to enter the cab, and thereby enhances the ability to seal the passage and resist ingress of environmental substances after running the conduits through. Still further, the ports separate the conduits from the edges of the openings, which may be sharp and can damage conduits, particularly when the openings are cut after manufacturing. Another benefit is that the tube members of the ports can be angled to facilitate conduits extending from one port to the other, as described above. Still other benefits and advantages are explicitly or implicitly described herein and/or recognized by those skilled in the art.

While the specific embodiments have been illustrated and described, numerous modifications come to mind without significantly departing from the spirit of the invention, and the scope of protection is only limited by the scope of the accompanying Claims.

What is claimed is:

1. A vehicle comprising:
    a chassis supporting a truck body and an operator cab and being connected to a plurality of wheels, wherein the operator cab has a wall defining an interior of the operator cab;
    an opening formed through the wall of the operator cab, in communication with the interior of the operator cab;
    a port connected to the wall of the operator cab around the opening, the port comprising a mounting structure connected to the wall and a tube member extending from the mounting structure and defining a passage therein, wherein the passage of the tube member is aligned with the opening;

a conduit extending through the opening and the passage of the tube member;

a second opening formed through a second portion of the wall of the operator cab, in communication with the interior of the operator cab;

a second port connected to the wall of the operator cab around the second opening, the second port comprising a second mounting structure connected to the wall and a second tube member extending from the second mounting structure and defining a second passage therein, wherein the second passage of the second tube member is aligned with the second opening; and a second conduit extending through the second opening and the second passage of the second tube member, wherein the operator cab has a left area, a right area, and a center console separating the left and right areas, wherein the wall comprises a console panel forming at least a portion of the center console and a floor panel supporting a seat within the operator cab, wherein the opening is formed in the floor panel, and the opening and the port are positioned behind the seat, and wherein the second opening is formed in the console panel, and the second opening and the second port are positioned in a side of the center console.

2. The vehicle of claim 1, wherein the conduit is connected to a first component outside the operator cab and a second component on the interior of the operator cab.

3. The vehicle of claim 1, wherein the mounting structure is connected to an exterior surface of the wall and the tube member extends through the opening to the interior of the operator cab, and wherein the length of the tube member is larger than a thickness of the wall.

4. The vehicle of claim 1, wherein the mounting structure comprises a flange extending outwardly around at least a portion of a periphery of the tube member and a plurality of fasteners connecting the flange to the wall.

5. The vehicle of claim 1, further comprising a sealant deposited within the passage and around the conduit.

6. A vehicle comprising:

a chassis supporting an operator cab and being connected to a plurality of wheels, wherein the operator cab has a wall defining an interior of the operator cab;

an opening formed through the wall of the operator cab, in communication with the interior of the operator cab;

a port connected to the wall of the operator cab around the opening, the port comprising a mounting structure connected to an exterior surface of the wall and a tube member extending from the mounting structure through the opening to the interior of the operator cab and defining a passage therein, wherein the mounting structure comprises a flange extending outwardly around at least a portion of a periphery of the tube member and a plurality of fasteners connecting the flange to the exterior surface of the wall; and a cover removably connected to the port and obstructing the passage, wherein the cover is removable from the port to open the passage.

7. The vehicle of claim 6, wherein the cover is connected to an end of the tube member.

8. The vehicle of claim 7, wherein the cover comprises a flat base that obstructs the passage and a depending member depending from a periphery of the base and extending along an outer surface of the tube member, wherein the depending member is removably connected to the tube member.

9. The port of claim 8, wherein the depending member of the cover and the second end of the tube member have corresponding apertures, and wherein the port further comprises a plurality of fasteners extending through the corresponding apertures to removably connect the cover to the depending member.

10. The vehicle of claim 6, wherein the tube member has an oval shape, and wherein the cover has an oval shape that is complementary with the oval shape of the tube member.

11. The vehicle of claim 6, wherein the wall comprises a floor panel supporting a seat within the operator cab, and wherein the opening is positioned behind the seat.

12. The vehicle of claim 6, wherein the operator cab has a left area, a right area, and a center console separating the left and right areas, and wherein the wall comprises a console panel forming at least a portion of the center console.

13. The vehicle of claim 12, wherein the console panel has a top portion configured to form at least a portion of a top surface of the center console and a pair of legs depending from the top portion to form at least portions of two sides of the center console, and wherein the opening is in one of the legs.

14. The vehicle of claim 6, further comprising:

a second opening formed through a second portion of the wall of the operator cab, in communication with the interior of the operator cab;

a second port connected to the wall of the operator cab around the second opening, the second port comprising a second mounting structure connected to the exterior surface of the wall and a second tube member extending from the second mounting structure through the second opening to the interior of the operator cab and defining a second passage therein, wherein the second mounting structure comprises a second flange extending outwardly around at least a portion of a periphery of the second tube member and a second plurality of fasteners connecting the second flange to the exterior surface of the wall; and a second cover removably connected to the second port and obstructing the second passage, wherein the second cover is removable from the second port to open the second passage.

15. The vehicle of claim 14, wherein the operator cab has a left area, a right area, and a center console separating the left and right areas, wherein the wall comprises a console panel forming at least a portion of the center console and a floor panel supporting a seat within the operator cab, wherein the opening is formed in the floor panel, and the opening and the port are positioned behind the seat, and wherein the second opening is formed in the console panel, and the second opening and the second port are positioned in a side of the center console.

16. A port configured for connection to a wall, the port comprising:

a mounting structure configured to be connected to a surface of the wall around an opening in the wall;

a tube member extending from the mounting structure and configured to extend through the opening to define a passage through the wall, wherein the mounting structure comprises a flange extending outwardly around at least a portion of a periphery of the tube member, the flange having a plurality of apertures configured to receive fasteners to connect the flange to the wall, wherein the tube member has a first end connected to the flange and a second end distal from the flange; and a cover removably connected to the second end of the tube member and obstructing the passage, wherein the cover is removable from the port to open the passage.

17. The port of claim 16, wherein the cover comprises a flat base that obstructs the passage and a depending member depending from a periphery of the base and extending along an outer surface of the tube member, wherein the depending member is removably connected to the tube member.

18. The port of claim 17, wherein the depending member of the cover and the second end of the tube member have corresponding apertures, and wherein the port further comprises a plurality of fasteners extending through the corresponding apertures to removably connect the cover to the depending member.

19. A vehicle comprising:

a chassis supporting a truck body and an operator cab and being connected to a plurality of wheels, wherein the operator cab has a wall defining an interior of the operator cab;

an opening formed through the wall of the operator cab, in communication with the interior of the operator cab;

a port connected to the wall of the operator cab around the opening, the port comprising a mounting structure connected to the wall and a tube member extending from the mounting structure and defining a passage therein, wherein the passage of the tube member is aligned with the opening;

a conduit extending through the opening and the passage of the tube member; and a sealant deposited within the passage and around the conduit.

20. A vehicle comprising:

a chassis supporting a truck body and an operator cab and being connected to a plurality of wheels, wherein the operator cab has a wall defining an interior of the operator cab;

an opening formed through the wall of the operator cab, in communication with the interior of the operator cab;

a port connected to the wall of the operator cab around the opening, the port comprising a mounting structure connected to the wall and a tube member extending from the mounting structure and defining a passage therein, wherein the passage of the tube member is aligned with the opening; and a conduit extending through the opening and the passage of the tube member, wherein the wall comprises a floor panel supporting a seat within the operator cab, and wherein the opening is positioned behind the seat.

21. A vehicle comprising:

a chassis supporting a truck body and an operator cab and being connected to a plurality of wheels, wherein the operator cab has a wall defining an interior of the operator cab;

an opening formed through the wall of the operator cab, in communication with the interior of the operator cab;

a port connected to the wall of the operator cab around the opening, the port comprising a mounting structure connected to the wall and a tube member extending from the mounting structure and defining a passage therein, wherein the passage of the tube member is aligned with the opening; and a conduit extending through the opening and the passage of the tube member, wherein the operator cab has a left area, a right area, and a center console separating the left and right areas, and wherein the wall comprises a console panel forming at least a portion of the center console.

22. The vehicle of claim 21, wherein the console panel has a top portion configured to form at least a portion of a top surface of the center console and a pair of legs depending from the top portion to form at least portions of two sides of the center console, and wherein the opening is in one of the legs.

* * * * *